United States Patent
Stumer et al.

(10) Patent No.: US 6,801,615 B2
(45) Date of Patent: Oct. 5, 2004

(54) CARRIER IDENTIFICATION CODES (CIC) CONVERSION

(75) Inventors: Peggy M. Stumer, Boca Raton, FL (US); David A. VanderMeiden, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 93 days.

(21) Appl. No.: 10/328,291

(22) Filed: Dec. 23, 2002

(65) Prior Publication Data

US 2004/0120497 A1 Jun. 24, 2004

(51) Int. Cl.[7] .................................................. H04M 7/00
(52) U.S. Cl. .............................. 379/221.02; 379/221.14
(58) Field of Search ........................... 379/220.01, 219, 379/221.01, 221.02, 221.14

(56) References Cited

U.S. PATENT DOCUMENTS

2001/0040957 A1 * 11/2001 McCann et al. ....... 379/221.13
2003/0161462 A1 * 8/2003 Stumer et al. ............... 379/242

* cited by examiner

Primary Examiner—Creighton Smith

(57) ABSTRACT

A Carrier Identification Code (CIC) aware private communications network. International calls are placed with a CIC from a station at an originating server and routed over a private network to a connected public network gateway switch located in another country for a far-end hop-off. The public network gateway switch includes a CIC cross reference table with corresponding local CICs. The public network gateway switch replaces the original CIC with a corresponding local CIC from the cross reference table. Then, the call egresses from the public network gateway switch to a corresponding selected carrier network and connects to the called party on the public communications network.

21 Claims, 2 Drawing Sheets

| 104 | 102 CICs | 122 USA 01 | 116 Germany 49 | 118 Jamaica 876 | 120 Mexico 52 | 114 Christmas Island 6724 |
|---|---|---|---|---|---|---|
| 106 | A (IMC) | 0222 | 2020 | 220 | 2300 | 24 |
| 108 | B (IT&T) | 0288 | - | 320 | - | 34 |
| 110 | C (Gen. Tel.) | 4000 | 4040 | - | 4300 | 44 |
| 112 | D (Horizon) | 5000 | 5050 | - | - | - |
|  |  |  |  |  |  |  |

100

CARRIER IDENTIFICATION CODES (CIC) CONVERSION

RELATED APPLICATION

The present application is related to U.S. patent application Ser. No. 10/085,317 entitled "CARRIER IDENTIFICATION CODES (CIC) TRANSPORT" to Peggy M. Stumer et al., filed Feb. 28, 2002, and assigned to the assignee of the present invention.

BACKGROUND OF THE INVENTION

1. Field of the Invention

The present invention is related to a communications network of internationally distributed connected devices and more particularly to, routing calls internationally over a private communications network to parties at stations on a public communications network.

2. Background Description

Carrier identification codes (CICs) are numeric codes that enable local exchange carriers (LECs) providing interexchange access services to identify the interexchange carrier (IXC) that the originating caller wishes to use to transmit its long distance or toll call. LECs use the CICs to route traffic to the proper IXC and to bill for long distance/toll access service provided. CICs enable callers to choose a telecommunications service provider, both by presubscription and by dialing a carrier access code, or CAC, that incorporates the carrier's unique CIC. Between 1983 and 1998, CICs were unique three-digit codes (XXX) and CACs were five-digit codes incorporating the CIC (10XXX).

In order to increase the number of CICs available for assignment, four-digit CICs replaced three-digit CICs in 1998. With the four-digit CIC, CACs become seven-digit codes. IXCs that had three-digit CICs did not get new codes. Rather, an initial zero was added to their old three-digit CIC (i.e., 0XXX) to make it a four-digit CIC. In addition, a "1" was added to the end of the CAC prefix (i.e., 101 0XXX). Consequently, some carriers advertised the new CAC as a "10 10 XXX" number. Thus, a telephone caller can "dial around" a presubscribed long distance or local toll telephone carrier to reach another carrier by dialing a seven-digit CAC, e.g., in the U.S., (101 XXXX)+1+Area Code+Number.

While this works well for calls placed from a station on the public network, the carrier selection fails for international calls placed from a private network. When a private network caller enters a CAC/CIC for a far-end hop-off to the public network, the call is routed over the private network to a gateway server to egress to the public network. As long as the call egress is in the same country in which it originated the call should complete successfully. However, each country assigns a CIC only when a particular carrier is licensed to operate in that country. So, unfortunately, when calls have an egress destination in another country, the carrier selection will fail because the CAC/CIC assignment for a particular carrier is seldom, if ever, the same value from country to country. Standards bodies have not addressed regulating or correlating CICs across country boundaries. So, private network users are not able to take advantage of a CAC/CIC for international calls routed over the private network to a gateway server in another country.

Thus, there is a need for a private network that passes calls placed in one country to the correct service provider at a far-end hop-off to the public network in another country.

SUMMARY OF THE INVENTION

It is a purpose of the invention to facilitate the use of carrier identification codes from private network calls;

It is another purpose of the invention to facilitate the use of carrier identification codes for calls to a destination in a public network originated by a caller located in a private network;

It is yet another purpose of the invention to facilitate the use of carrier identification codes for calls to a destination in a public network originated by a caller remotely accessing the facilities of a private network;

It is yet another purpose of the invention to facilitate the use of carrier identification codes for private network international calls;

It is yet another purpose of the invention to facilitate the use of carrier identification codes for international calls to a party in the public network routed first over private network facilities.

The present invention relates to a Carrier Identification Code (CIC) aware private communications network. International calls are placed with a CIC from a station at an originating server and routed over a private network to a connected public network gateway switch located in another country for a far-end hop-off. The public network gateway switch includes a CIC cross reference table with corresponding local CICs. The public network gateway switch replaces the original CIC with a corresponding local CIC from the cross reference table. Then, the call egresses from the public network gateway switch to a corresponding selected carrier network and connects to the called party on the public communications network.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figures 1, 3:
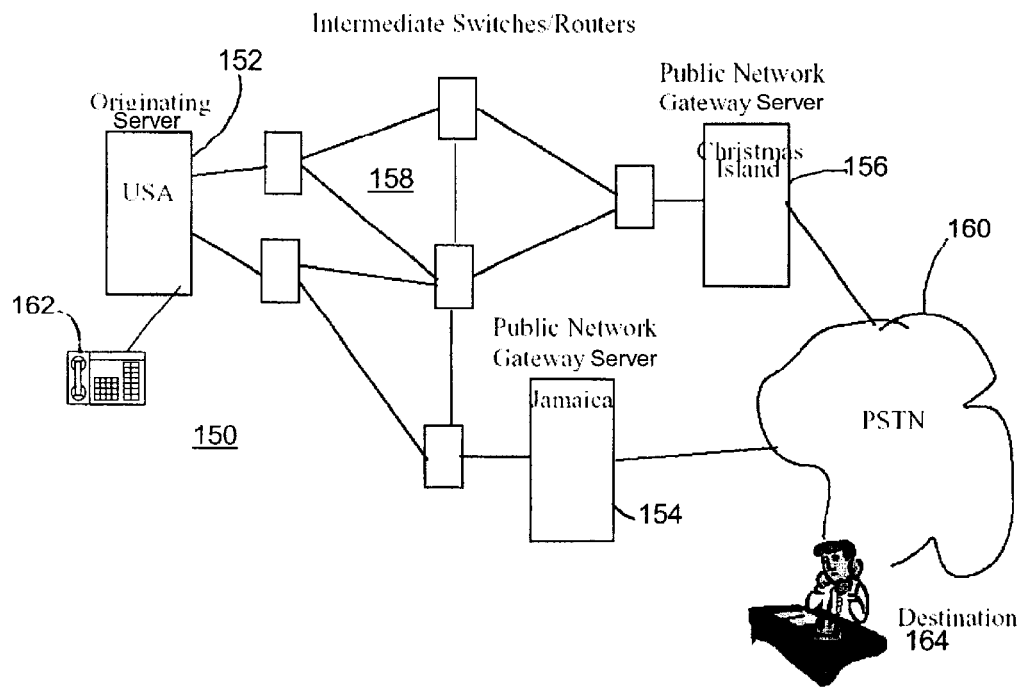
FIG. 1 shows an example of a Carrier Identification Code (CIC) correspondence table with country dependent CIC information for inclusion in public network gateway switches according to a preferred embodiment of the present invention.
FIG. 3 shows an example of a CIC aware private network with a private network originating server and public network gateway switches, all located in different countries.

Turning now to the drawings and, more particularly, FIG. 1 shows an example of a Carrier Identification Code (CIC) correspondence table 100 with country dependent CIC information such as may be included in each public network gateway switch according to a preferred embodiment of the present invention. A preferred embodiment private network is CIC aware and, each such public network gateway switch substitutes the correct CIC for the originally selected carrier, if necessary, from a CIC cross reference table (e.g., 100) as calls egress the private network to the public network.

In this example, the table 100 includes entries for each carrier listed in column 102 in each country listed in heading row 104. The CIC length (number of digits) is fixed in any given country. Typically, the CIC value for a given carrier and possibly, the CIC length, may differ from country to country. In this example, sample entries are represented for four carriers, e.g., IMC 106, IT&T 108, General Telecom 110 and Horizon 112 for each of five countries, e.g., Christmas Island 114, Germany 116, Jamaica 118, Mexico 120 and the U.S. 122.

A local administrator sets up the table 100 and maintains CIC values for the local country code. Further, the CIC correspondence table 100 includes country code entries for every country where a connected public network gateway switch is located. Each carrier row 106, 108, 110, 112 has the assigned CIC value for that carrier administered for each country 114, 116, 118, 120, 122. A dash "-" indicates a country where a carrier is not supported/licensed. Each public network gateway uses such a local look-up table 100 to replace the originally selected CIC value with the corresponding local country CIC value. Thus, each international call egressing to the public network at the public network gateway switch is mapped to the associated CIC value for the same carrier in the country of egress. The CIC correspondence table 100 has only one corresponding entry for each country, regardless of the number of gateways in any one country.

Whenever, the selected carrier for a particular call is not supported/licensed in the destination country, i.e., the corresponding entry is a dash, one of several options may be selected. For example, the calling party may be notified of the unavailability of the selected carrier and be allowed to select a different carrier, e.g., with a special tone, display or prompt for a new CIC. A default carrier may be pre-selected and substituted for the requested carrier to complete the call. The call may be terminated and a notice of a temporary failure provided to the caller to allow the caller a chance to select a secondary carrier.

So, when a private network user places a long distance call, e.g., dialing a Carrier Access Code (CAC) and a particular CIC from a station in the CIC aware private network (or a virtual open network such as the Internet), the call is routed on-net (e.g., for far-end hop-off) to the public network. The call may cross a country code boundary where a CIC aware local gateway switch converts or maps the original CIC value to the appropriate CIC value for the selected carrier where the call egresses to the public network.

Figure 2:
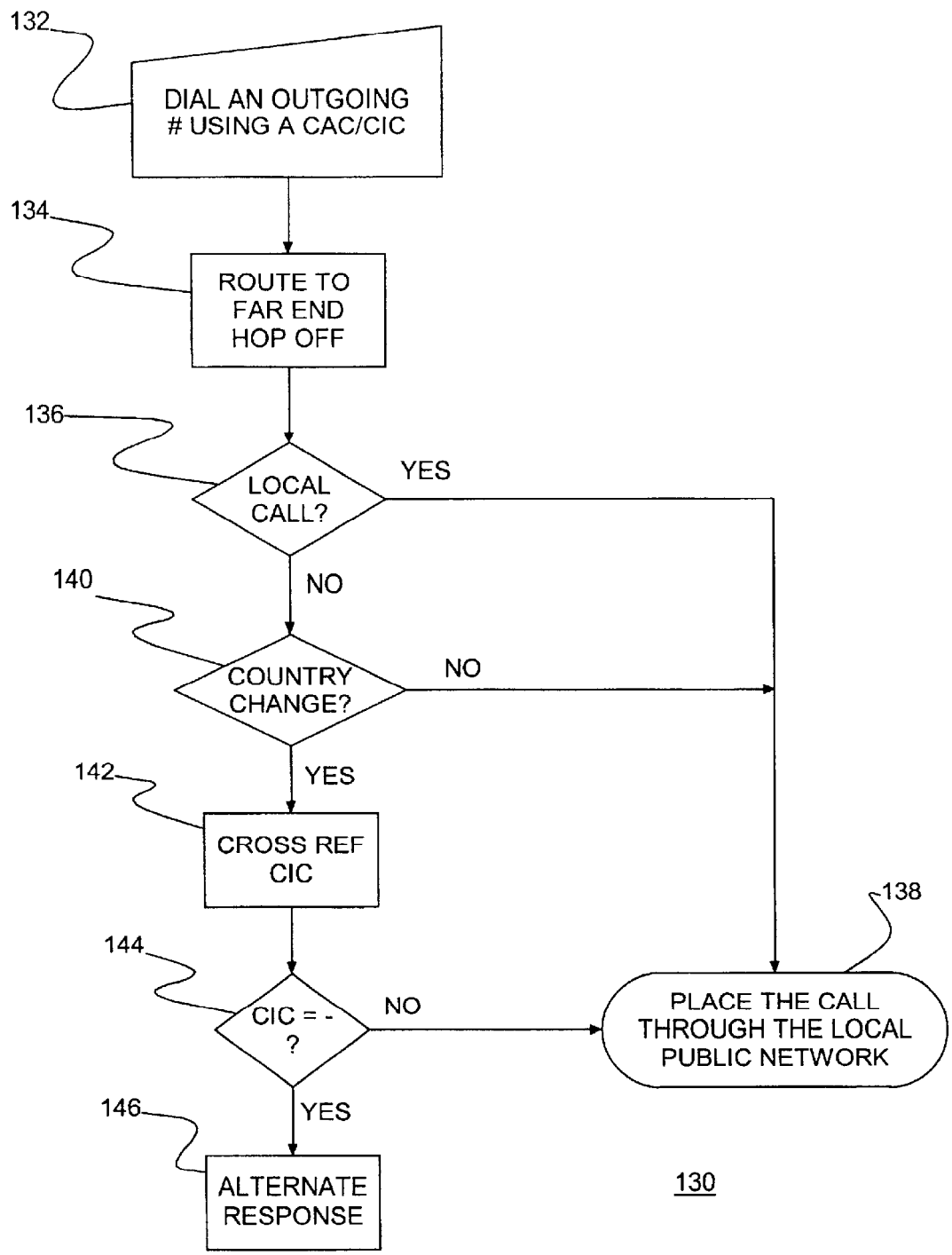
FIG. 2 shows an example of how such a preferred embodiment CIC aware network handles calls whenever a CAC/CIC is included in the called number dialing string.

FIG. 2 shows an example 130 of how such a preferred embodiment CIC aware network handles calls whenever a CIC included in the called number dialing string in step 132 to select a carrier. First, in step 134 the CIC aware network routes the call to a far end hop off at a public network gateway switch, preferably, as close to the called party location as possible. In step 136 if the called party is local to the public network gateway, then the call is routed as a local call in step 138. If, however, the call is not local, then in step 140, the number routing is checked to determine if it has crossed country borders between its originating location and its hop off point. If no country change has occurred, then the call is placed through the local public network unchanged in step 138. Otherwise, in step 142 the public network gateway switch cross references a corresponding local CIC with the originally selected carrier from the CIC cross reference table, e.g., table 100 in FIG. 1. If a cross reference is found, then, in step 144 the corresponding local CIC is not a dash and the public network gateway switch passes the call to the public network in step 146 with the corresponding local CIC substituted for the original CIC. Otherwise, the public network gateway switch takes other appropriate actions such as one of the above described options.

The calling party number is transported through the private network, for example in explicit E.164 international number format without prefix/barrier codes included in the digit string. Number parsing schemes are known that can be used to derive the country code. The public network gateway switch finds the country code of the calling party in the CIC cross reference table. CIC transport options are described in U.S. patent application Ser. No. 10/085,317 entitled "CARRIER IDENTIFICATION CODES (CIC) TRANSPORT" to Peggy M. Stumer et al., filed Feb. 28, 2002, and assigned to the assignee of the present invention and incorporated herein by reference.

For example, a call originating in the U.S. includes an E.164 country code of "1" in the calling party number digit string. Selecting IMC as the carrier (0222 for U.S. in table 100 of FIG. 1), the caller dials 10 10 222 (or actually 101 0222), where 101 is the CAC and 0222 is the CIC. At the far end hop off, the public network gateway switch locates the CIC value for the calling party's country and cross references the original CIC to the corresponding local country E.164 country code value. In this example, using the CIC correspondence table 100 of FIG. 1, the CICs are cross referenced by locating the CIC in the corresponding column 114, 116, 118, 120 and in the same row 106 as the original CIC. So, a Jamaica switch selects the corresponding CIC value (column 118, row 106) for IMC of 220 or, a Christmas Island switch selects 24 (column 114, row 106). It should be noted that a CIC may be unnecessary for calls that are egressing to the public network locally to the called station, e.g., calls from the U.S. to a Christmas Island station may egress locally to the Christmas Island switch and can be placed from the switch as a local call. Once the corresponding code is selected, the public network gateway switch converts (replaces) the CIC value 0222 to the local country CIC value and the call egresses to the public network with the corresponding CIC attached.

FIG. 3 shows an example of a CIC aware private network 150 with a private network server 152, e.g., a private branch exchange (PBX), and connected remote public network gateway switches 154, 156, each of which may be located in a different country, e.g., the United States, Jamaica and Christmas Island, respectively. Typically, the private network server 152 connects through intermediate switches, routers and/or servers (e.g., IP networking and collectively 158) to the remote public network gateway switches 154, 156. Further, intermediate servers may be located with the remote public network gateway switches 154, 156 and act as originating servers wherever they are located with appropriate connected local communications devices 162 in originating countries. Public network gateway switches 154, 156 are each connected to a public network, e.g., the public switched telephone network (PSTN) 160 in this example, with connected local stations 164.

So, for example, a caller at a station 162 connected to the private network server 152 in the U.S. dials an international public network number (step 132 in FIG. 2) using the local CAC/CIC for IMC (0222 for this example) calling a station 164 on the PSTN 160 located at Christmas Island. The call is routed for far-end hop-off (step 134) over the private network 150, e.g., IP networking or circuit-switched network devices 158 (e.g., time division multiplexing (TDM) devices) or, alternatively over the Internet, to a public network gateway switch, 154 or 156 in this example. Routed calls may traverse the private network 150 in any number of ways depending on network outages, congestion, etc. The caller seldom knows how a call will be routed or where the call will egress to the public network 160. This is especially true with an IP private network, where the final egress to the public network 160 is difficult to predict. Preferably, the CIC conversion in step 142 takes place only once, upon egress at the public network gateway switch 154 or 156. Each public network gateway switch 154 or 156 uses the country code from the calling party number to identify the requested carrier from the corresponding CIC in the CIC conversion table.

However, regardless of the routing, either the egress will be local to the called party or, remote and a long distance call from the public network gateway switch to the called party. Thus, the connection may be through on-net routing to the gateway 156 and the public network 160 (Christmas Island for this example) may be local, where a long distance carrier is unnecessary. Alternately, however, the connection may be through on-net routing to an available gateway 154 closest to the destination 164 (Jamaica for this example), where the CIC is converted to the local CIC for the selected carrier (IMC in this example) and passed to the public network 160 for connection through that carrier. The CIC conversion from the originating CIC (US, IMC of 0222) to the corresponding far end CIC (Christmas Island, IMC of 24) occurs at the outgoing public network gateway switch 156. The same CIC conversion table resides in each public network gateway switch 154, 156 in the private network 150 with synchronized identical conversion values in every switch 154, 156.

Advantageously, calls originating anywhere in a private network or, from callers remotely accessing the private network facilities, are routed to a far end hop off at a public network gateway server without losing public carrier selection. Callers can select a public carrier and that public carrier selection is maintained when the call eventually egresses to a foreign public network. Further, the present invention has application to resolve resource numbering/identification conflicts that might otherwise arise in a system or a wide area network, e.g., where an in-band digit sequence is used to selectively access remote resources.

Further, the present invention has application to a wide variety of different networks. The present invention may be employed in any state of the art communications server for improved voice and data services over public networks, private networks and between public and private networks. Essentially, the present invention has application to any state of the art communications network operating in accordance with well-known standards such as International Standards Organization (ISO), European Computer Manufacturers Association for Standardizing Information and Communication Services (ECMA), European Telecommunications Standards Institute (ETSI), Integrated Services Digital Network (ISDN) signaling, "Q" reference point (QSIG) compliant ISDN, computer supported telephony applications/computer telephony interface (CSTA/CTI) network via applications programming interfaces (API), signaling over Internet Protocol (IP), and Asynchronous Transfer Mode (ATM) networks.

While the invention has been described in terms of preferred embodiments, those skilled in the art will recognize that the invention can be practiced with modification within the spirit and scope of the appended claims.

What is claimed is:

1. A Carrier Identification Code (CIC) aware private communications network comprising:
   at least one communications server with a plurality of connected communications devices on a private network of connected servers, said at least one communications server being an originating server, calls being placed from ones of said connected communications devices by entering a called party number, said originating server routing long distance calls over said private network, said long distance calls selectively including a CIC;
   at least one public network gateway switch connected to said private network and located in a country different than said originating server, said public network gateway switch further connected to a public communications network and receiving selected said long distance calls from said originating server; and
   a CIC cross reference table in said at least one public network gateway switch, said public network gateway switch replacing said CIC in each received long distance call with a corresponding local CIC from said cross reference table, said each received long distance call with said replaced CIC egressing from said public network gateway switch to a corresponding selected carrier, whereby a user entering a long distance number at one said communications device is connected by said corresponding selected carrier to a called party on said public communications network.

2. A CIC aware communications network as in claim 1, wherein ones of said connected servers are located in countries different than said originating server, each of said ones being another said originating server.

3. A CIC aware communications network as in claim 1, wherein said CIC cross reference table includes entries for each country in which each said at least one public gateway switch is located.

4. A CIC aware communications network as in claim 3 further comprising a plurality of originating servers distributed in originating countries and least one public gateway switch is a plurality of public gateway switches distributed in gateway countries, and wherein said CIC cross reference table includes entries for each of said originating countries and said gateway countries.

5. A CIC aware communications network as in claim 1, wherein each said at least one public gateway switch identifies arriving calls directed to local public network stations as local calls, identified said local calls egressing to said public communications network as local calls.

6. A CIC aware communications network as in claim 1, wherein said private network is an Internet protocol (IP) network.

7. A CIC aware communications network as in claim 1, wherein said private network is a network of circuit switched devices.

8. A CIC aware communications network as in claim 1, wherein said circuit switched devices are time division multiplexed (TDM) devices.

9. A CIC aware communications network as in claim 1, wherein said at least one public gateway switch returns an error message for any arriving call not having a local CIC entry in said CIC cross reference table.

10. A CIC aware communications network as in claim 1, wherein ones of said connected servers are located in countries with ones of said at least one gateway switch and are each another said originating server, said CIC cross reference table including entries for each of said countries.

11. A CIC aware communications network as in claim 10, wherein said at least one public gateway switch identifies arriving calls directed to local public network stations as local calls, identified said local calls egressing to said public communications network as local calls.

12. A CIC aware communications network as in claim 11, wherein said at least one public gateway switch returns an error message for any arriving call not having a local CIC entry in said CIC cross reference table.

13. A method of managing international calls from a private communications network, said private communications network including at least one communications server in a first country and at least one public network gateway server in another country, said method comprising the steps of:

a) including a carrier identification code (CIC) in called party number;
b) routing said called party number to a remote public network gateway switch for a far end hop off;
c) cross referencing said included CIC with a plurality of local CICs to identify a corresponding local CIC; and
d) egressing to a local public network with a corresponding called party number.

14. A method of managing international calls as in claim 13, wherein if said remote public network gateway switch is located in the same country from which the call was routed, said included CIC matches said corresponding local CIC in step (c) and step (d) comprises egressing to said local public network with said called party number.

15. A method of managing international calls as in claim 13, wherein before the egressing step (d) further comprises replacing a included CIC with a corresponding local CIC to form said corresponding called party number.

16. A method of managing international calls as in claim 14, wherein at least one CIC is unavailable for at least one locality and in step (c), whenever an included CIC is identified as being to an unavailable CIC, a default CIC is identified as said corresponding local CIC.

17. A method of managing international calls as in claim 14, wherein if a corresponding local CIC value is not available in step (c), an error message is returned to the caller.

18. A method of managing international calls as in claim 17, wherein said error message directs said caller to select another CIC.

19. A method of managing international calls as in claim 13, wherein the egressing step (d) comprises determining if the routed call is local to said remote public network gateway switch, calls determined local to said remote gateway switch egressing as a local calls.

20. A method of managing international calls as in claim 13, wherein said corresponding CIC is selected from a CIC cross reference table located in said remote public network gateway switch.

21. A method of managing international calls as in claim 20, wherein said CIC cross reference table includes entries for each country in which at least one connected said remote public gateway switch is located.

* * * * *